A. MORAND.
BRICK-KILN.

No. 171,627.

Patented Dec. 28, 1875.

Witnesses:
A. E. Fraser.
Chas. M. Higgins.

Inventor:
Augustus Morand,
Per Burke & Fraser,
Attorneys.

UNITED STATES PATENT OFFICE.

AUGUSTUS MORAND, OF GERMANTOWN, PENNSYLVANIA.

IMPROVEMENT IN BRICK-KILNS.

Specification forming part of Letters Patent No. 171,627, dated December 28, 1875; application filed December 2, 1875.

*To all whom it may concern:*

Be it known that I, AUGUSTUS MORAND, of Germantown, Philadelphia, Pennsylvania, formerly of Brooklyn, New York, have invented an Improved Kiln for Drying and Burning Bricks, tiles, ceramic wares, and other similar substances, of which the following is a specification:

My invention relates to that class of kilns composed of two longitudinal series of drying and burning chambers communicating through transverse openings at their ends, and it is an improvement on that form of kiln described in my patent of April 16, 1872, No. 135,832.

It is the object of my present invention to produce a kiln in which the fire, after being once started, may be kept continuously burning, being transferred from one chamber to another, as occasion requires; and it consists in the novel position and arrangement of the double series of main flues and their connections, as hereinafter fully set forth.

Figure 1:
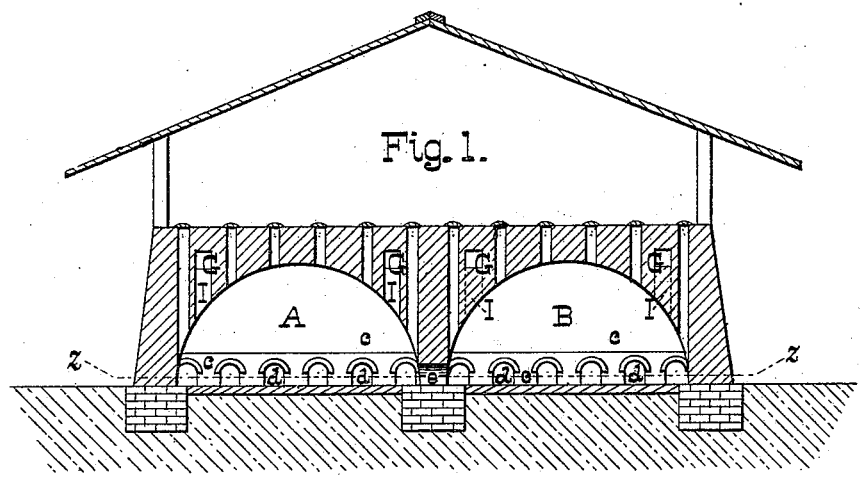
Figure 2:
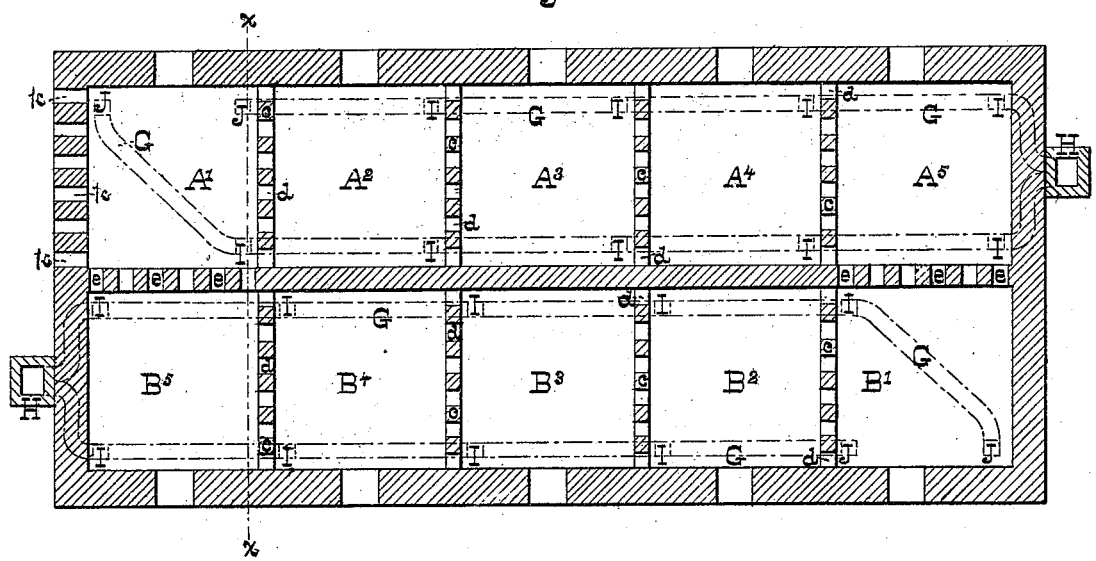

Figure 1 of the accompanying drawings is a vertical section of my improved kiln, taken on line $x$ $x$ of Fig. 2. Fig. 2 is a sectional plan on line $z$ $z$ of Fig. 1, the flues G G, situated over the chambers, being shown in dotted lines.

As represented in the drawings, $A^1$ to $A^5$ are the drying and burning chambers of the kiln, which are preferably built in a right line with each other, and which are inclosed with strong well-built outer walls and arched roof, lined with fire-proof material. The chambers are separated by transverse partitions $c$ $c$, in which air-holes $d$ $d$ are left, to be opened or closed at pleasure in the operations of the kiln. Each chamber is also provided with an outer doorway, through which the brick or other wares are conveyed in filling or emptying the chamber, and which are likewise closed in the customary manner with temporary walls of brick. In the chamber $A^1$, and situated preferably in the outer wall thereof, is arranged a series of fire-places, $k$ $k$, and each chamber is provided with a series of stoking-holes, which are formed in the arched roof thereof. The entire kiln is preferably covered, and the workmen protected, by a shed or roof, as seen in Fig. 1. G G are horizontal steam and smoke draft flues, formed longitudinally through the arched roof of the kiln, one being on each side thereof, as shown in Fig. 1. Vertical connecting flues or passages I I are formed on each side of the arch through the top of each chamber, and preferably at that end thereof farthest from the fire-places $k$ $k$, so as to communicate with the flues G G, as shown more clearly in Fig. 1. The flues I I are controlled by dampers $m$ $m$, arranged to be operated from the upper chamber of the kiln, as also seen in Fig. 1. The two main flues G G open into a common chimney, H, at one end of the kiln, but their communication therewith is controlled by suitable dampers.

The above-described features of my improved kiln form no part of my present invention, they having been shown and described in my before-mentioned patent of April 16, 1872, and are in themselves but slightly modified in my present improved form of kiln.

The chief distinguishing feature of my present invention is in the employment of a double archway, or two longitudinal series of chambers, $A^1$ to $A^5$ and $B^1$ to $B^5$, arranged together side by side, and communicating with each other transversely at their ends by means of draft-apertures $e$ $e$ formed in the longitudinal dividing-wall. These apertures $e$ $e$ are similar to the apertures $d$ $d$ in the transverse partitions $c$ $c$, and their purpose is to form a means of communication from one longitudinal series to the other, through which the heated gases from the end chamber of one series may be drawn into the end chamber of the next, to dry and burn the charge of green brick therein contained, and form a means of establishing a continuous and circuitous draft through all the chambers of the kiln, enabling the burning to be proceeded with, as in the case of an annular kiln, yet retaining all the superior advantages of a straight kiln.

Another distinguishing feature is that the upper longitudinal flues G G are, in chambers $A^1$ and $B^1$, arranged to open on the same side of the chamber at J J, as shown by the dotted lines in Fig. 2, which brings both vertical openings directly opposite the transverse apertures $e$ $e$, the purpose of which arrangement will be hereafter explained.

Each archway is also provided with a separate chimney, H, each communicating with a distinct series of draft-flues, and these series are relatively reversed in position, causing the chimneys to be placed at opposite ends of the kiln. It will also be seen that the two diagonally-opposite end chambers $A^1$ and $B^1$ are provided with one more of the vertical flues I I than are formed in any of the other chambers of the kiln.

The operation of my improved kiln is as follows: The chambers $A^1$ $A^2$, &c., being filled with green bricks or other articles for drying and burning, and the doorways, communicating-openings, and stoke-holes being closed, fires are built in the fire-places k k, in chamber $A^1$, the dampers m m controlling the opening of the flues I I, communicating with the main flues G G, are opened, and the communication established in chamber $A^1$, while the vertical flues I I in the other chambers are closed. As the bricks gradually become heated, and give off their steam or vapor in drying, this vapor is at once carried off through the flues G G, and from the position and peculiar arrangement of the opening into said flues on either side of the crown of the arch the moisture is carried off from all parts of the chamber uniformly and expeditiously. When the bricks or other articles in the first chamber, $A^1$, are sufficiently dried, instead of wasting the heat therein by continuing the draft directly with the chimney through the upper flues G G, the passages I I in chamber $A^2$, communicating with said flues, are opened, and those in $A^1$ are nearly closed. The surplus heat necessarily obtained in finishing the burning in chamber $A^1$ is thus utilized in drying and burning the fresh charge of bricks in chamber $A^2$, and this process is repeated as the burning progresses until the last chamber, $A^5$, is reached. When the bricks or other articles in this last chamber $A^5$ are sufficiently dried the surplus heat is drawn through the apertures e e into the adjoining chambers $B^1$ of the other series to dry the charge of green brick therein contained, which is effected by directing the draft into the main flues G G through the two vertical openings J J situated directly opposite the apertures e e, the flue I in this chamber being closed.

It will be perceived that, as these flues J J are placed directly opposite the apertures e e, the draft through the latter is equal, and the heated gases are drawn through the charge of brick, so as to dry and burn the same equally throughout, whereas, if the openings were not thus placed, the burning would not be equal in the different parts of the chamber.

When the brick in this chamber is sufficiently dried the heated gases produced by its burning are drawn into the next chamber, and this operation is repeated until the end chamber $B^5$ is reached, when the gases are drawn into $A^1$ (which has been previously refilled with green brick) in the same manner that it was drawn from $A^5$ into $B^1$, as before described.

The above-described process may be continued for an indefinite period, the drying, burning, and cooling of the bricks or other articles in each successive chamber of the kiln being conducted continuously, regularly, and uniformly, and with very great economy of fuel.

What I claim as my invention is—

In a drying or burning kiln composed of two longitudinal series of chambers, A and B, communicating with each other by means of transverse apertures between the end chambers thereof, the main flues G G, each having openings J J in the two diagonally-opposite end chambers, arranged both on the same side of the said chambers and opposite the draft-apertures e e, substantially as and for the purposes set forth.

In witness whereof I have hereunto signed my name in the presence of two subscribing witnesses.

AUGS. MORAND.

Witnesses:
 ARTHUR C. FRASER,
 CHAS. M. HIGGINS.